US012802860B2

(12) United States Patent
Yoshioka et al.

(10) Patent No.: US 12,802,860 B2
(45) Date of Patent: Nov. 17, 2026

(54) INDUCTOR COMPONENT

(71) Applicant: Murata Manufacturing Co., Ltd., Kyoto-fu (JP)

(72) Inventors: Yoshimasa Yoshioka, Nagaokakyo (JP); Ryouta Sakurai, Nagaokakyo (JP); Kouji Yamauchi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 1136 days.

(21) Appl. No.: 17/818,556

(22) Filed: Aug. 9, 2022

(65) Prior Publication Data

US 2023/0047996 A1 Feb. 16, 2023

(30) Foreign Application Priority Data

Aug. 10, 2021 (JP) ................................ 2021-130785

(51) Int. Cl.

| | |
|---|---|
| ***H01F 27/28*** | (2006.01) |
| ***H01F 1/34*** | (2006.01) |
| ***H01F 27/255*** | (2006.01) |
| ***H01F 27/29*** | (2006.01) |

(52) U.S. Cl.

CPC ........... *H01F 27/255* (2013.01); *H01F 1/344* (2013.01); *H01F 27/29* (2013.01)

(58) Field of Classification Search

CPC ........ H01F 27/255; H01F 1/344; H01F 27/29; H01F 1/15375; H01F 1/24; H01F 1/26; H01F 2003/106; H01F 3/10; H01F 17/04; H01F 41/046; H01F 2017/048; H01F 27/292; H01F 2017/0066; H01F 17/0013

USPC ........................... 336/83, 200, 232, 198, 192

See application file for complete search history.

(56) References Cited

U.S. PATENT DOCUMENTS

| | | | | |
|---|---|---|---|---|
| 2017/0169930 | A1 * | 6/2017 | Kudo | H01F 17/0013 |
| 2018/0166199 | A1 * | 6/2018 | Hachiya | H01F 17/0013 |
| 2021/0134516 | A1 * | 5/2021 | Yoshioka | H01F 27/2804 |

FOREIGN PATENT DOCUMENTS

| | | | |
|---|---|---|---|
| CN | 106463239 | A | 2/2017 |
| JP | 2016-009858 | A | 1/2016 |
| JP | 2018-0022867 | A | 2/2018 |
| JP | 2018-098278 | A | 6/2018 |

(Continued)

*Primary Examiner* — Shawki S Ismail
*Assistant Examiner* — Kazi S Hossain
(74) *Attorney, Agent, or Firm* — Studebaker Brackett PLLC

(57) ABSTRACT

An inductor component includes an element body including magnetic powder and having first and second principal surfaces; an inductor wiring in the element body; a first vertical wiring that is in the element body, is connected to a first end portion of the inductor wiring, and extends to the first principal surface; a second vertical wiring that is in the element body, is connected to a second end portion of the inductor wiring, and extends to the first principal surface; and first and second external terminals exposed on the first principal surface and connected to the first and second vertical wirings, respectively. The magnetic powder contains an Fe element as a main component, and the first principal surface has an oxidized region, in which an oxide film of oxidized particles of the magnetic powder, is exposed and a non-oxidized region in which particles of the magnetic powder are exposed.

18 Claims, 10 Drawing Sheets

(56) References Cited

FOREIGN PATENT DOCUMENTS

| | | | |
|---|---|---|---|
| JP | 2018-107199 | A | 7/2018 |
| JP | 2020-145399 | A | 9/2020 |
| JP | 2021-77714 | A | 5/2021 |
| JP | 2021-100027 | A | 7/2021 |
| WO | 2021/029141 | A1 | 2/2021 |

* cited by examiner

INDUCTOR COMPONENT

CROSS-REFERENCE TO RELATED APPLICATION

This application claims benefit of priority to Japanese Patent Application No. 2021-130785, filed Aug. 10, 2021, the entire content of which is incorporated herein by reference.

BACKGROUND

Technical Field

The present disclosure relates to an inductor component.

Background Art

Conventionally, as an inductor component, there is an inductor component described in Japanese Patent Application Laid-Open No. 2020-145399. The inductor component includes an element body containing metal magnetic powder particles; first and second coil portions disposed inside the element body; a first external electrode electrically connected to one end of the first coil portion; and a second external electrode electrically connected to one end of the second coil portion. Further, the inductor component includes an insulating layer formed by oxidizing the metal magnetic powder particles on the entire surface of the element body, and the insulating layer prevents a short circuit between the inductor component and another electronic component.

SUMMARY

However, it has been found that the conventional inductor component has the following problems.

Since the oxidized metal magnetic powder particles expand, a close contact property between the element body and the metal magnetic powder particles becomes weak, and there is a problem that the strength of the element body decreases. In addition, there is a problem that the oxidized metal magnetic powder particles fall off from the element body, and the number of the metal magnetic powder particles decreases, thereby decreasing the inductance. Therefore, the present disclosure provides an inductor component capable of suppressing a decrease in strength of an element body and a decrease in inductance while suppressing a short circuit between external terminals.

An inductor component according to an aspect of the present disclosure includes an element body including magnetic powder and having a first principal surface and a second principal surface; an inductor wiring provided in the element body; a first vertical wiring that is provided in the element body, is connected to a first end portion of the inductor wiring, and extends to the first principal surface; a second vertical wiring that is provided in the element body, is connected to a second end portion of the inductor wiring, and extends to the first principal surface; a first external terminal connected to the first vertical wiring and exposed on the first principal surface; and a second external terminal connected to the second vertical wiring and exposed on the first principal surface. The magnetic powder contains an Fe element as a main component. The first principal surface has an oxidized region in which an oxide film, formed by oxidizing a plurality of particles of the magnetic powder, is exposed and a non-oxidized region in which a plurality of particles of the magnetic powder are exposed.

Here, the oxidized region refers to a region containing the Fe element at 65% by weight or more and an O element at 24% by weight or more, and the non-oxidized region refers to a region containing the Fe element at 65% by weight or more and the O element at less than 24% by weight.

According to the above embodiment, the oxidized region prevents a short circuit between the first external terminal and the second external terminal through the magnetic powder on the first principal surface, and the non-oxidized region can suppress a decrease in strength of the element body and a decrease in inductance.

Preferably, in an embodiment of the inductor component, the element body includes a resin containing the magnetic powder, and the plurality of particles of magnetic powder in the oxidized region include a magnetic powder particle in contact with the resin with the oxide film interposed therebetween.

According to the above embodiment, the magnetic powder in the oxidized region comes into contact with the resin with the oxide film interposed therebetween, and thus, it is possible to more effectively suppress the short circuit.

Preferably, in an embodiment of the inductor component, the element body includes a resin containing the magnetic powder, and the plurality of particles of magnetic powder in the oxidized region include a magnetic powder particle in direct contact with the resin.

According to the above embodiment, the magnetic powder in the oxidized region is in direct contact with the resin, a close contact property between the magnetic powder and the resin is improved, and it is possible to more effectively suppress the decrease in the strength of the element body and the decrease in the inductance.

Preferably, in an embodiment of the inductor component, a ratio of a reflectance of a wavelength of 600 nm or more and 800 nm or less (i.e., from 600 nm to 800 nm) relative to a reflectance of a wavelength of less than 600 nm is higher in the oxidized region than in the non-oxidized region.

According to the embodiment, red is reflected more greatly by the oxidized region than by the non-oxidized region. Therefore, the oxidized region appears to be red (warm color), and thus, it is possible to easily grasp that the oxidized region is formed, and to confirm, from the appearance, that the oxidized region has a short-circuit resistance.

Preferably, in an embodiment of the inductor component, the oxide film is formed on cut surfaces of the plurality of particles of the magnetic powder.

According to the above embodiment, in a case where the element body is ground to reduce a thickness of the element body, the magnetic powder particle is cut to expose the cut surface of the magnetic powder particle, but the short-circuit resistance can be improved since the oxide film is formed on the cut surface of the magnetic powder particle.

Preferably, in an embodiment of the inductor component, the first principal surface has an overlapping region overlapping the inductor wiring that is located closest to the first principal surface, and the oxidized region is located in the overlapping region when viewed from a direction orthogonal to the first principal surface.

According to the above embodiment, the oxidized region is located along the inductor wiring when viewed from the direction orthogonal to the first principal surface. Thus, in a case where a plurality of the inductor wirings are provided, it is possible to increase an insulation resistance between the adjacent inductor wirings on the first principal surface. In addition, in a case where a plurality of the inductor components are disposed, it is possible to increase an insulation resistance between the inductor wirings of the adjacent inductor components. In addition, it is possible to suppress the decrease in the strength of the element body due to the oxidation by limiting the oxidized region.

Preferably, in an embodiment of the inductor component, the first principal surface has an overlapping region overlapping the inductor wiring that is located closest to the first principal surface, and the oxidized region is located in a non-overlapping region other than the overlapping region on the first principal surface when viewed from a direction orthogonal to the first principal surface.

According to the above embodiment, the oxidized region is located in the non-overlapping region when viewed from the direction orthogonal to the first principal surface. Thus, it is possible to increase an insulation resistance between wirings of adjacent turns of the same inductor wiring on the first principal surface. In addition, in a case where a plurality of the inductor wirings are provided, it is possible to increase an insulation resistance between the adjacent inductor wirings on the first principal surface. In addition, in a case where a plurality of the inductor components are disposed, it is possible to increase an insulation resistance between the inductor wirings of the adjacent inductor components. In addition, it is possible to suppress the decrease in the strength of the element body due to the oxidation by limiting the oxidized region.

Preferably, in an embodiment of the inductor component, a thickness of the oxide film is smaller than a particle size D50 of the magnetic powder.

According to the above embodiment, the excessive progress of oxidation causes a problem due to the decrease in the strength of the element body or shedding of particles of the magnetic powder, but the problem can be avoided since the oxide film is thinner than one magnetic powder particle.

Preferably, in an embodiment of the inductor component, the second principal surface has the oxidized region, and an area of the oxidized region on the second principal surface is larger than an area of the oxidized region on the first principal surface.

According to the above embodiment, in a case where no external terminal is present on the second principal surface, for example, the oxidized region can be formed on the entire second principal surface, and a short circuit on the second principal surface can be suppressed.

Preferably, in an embodiment of the inductor component, the second principal surface has the oxidized region, and a thickness of the oxide film on the second principal surface is smaller than a thickness of the oxide film on the first principal surface.

According to the above embodiment, in a case where no external terminal is present on the second principal surface, a short circuit on the second principal surface is less likely to occur than a short circuit on the first principal surface, and thus, the thickness of the oxide film on the second principal surface can be reduced, whereby the strength of the element body can be maintained.

Preferably, in an embodiment of the inductor component, the oxidized region is provided only on the first principal surface.

According to the above embodiment, the area of the oxidized region can be minimized, and thus, it is possible to increase an insulating property while ensuring the strength of the element body.

Preferably, in an embodiment of the inductor component, the element body has a plurality of side surfaces located between the first principal surface and the second principal surface and connecting the first principal surface and the second principal surface, and the oxidized region is provided only on the first principal surface and at least one of the side surfaces.

According to the above embodiment, the area of the oxidized region can be suppressed, and thus, it is possible to increase the insulating property while ensuring the strength of the element body.

Preferably, in an embodiment of the inductor component, the element body has a side surface located between the first principal surface and the second principal surface and connecting the first principal surface and the second principal surface, a first extended wiring connected to the first end portion of the inductor wiring and exposed from the side surface is further provided, and the side surface from which the first extended wiring is exposed has the oxidized region.

According to the above embodiment, since the first extended wiring is provided, the strength can be secured at the time of cutting the element body when the inductor component is diced into an individual piece, and a yield at the time of manufacturing can be improved. In addition, since the side surface from which the first extended wiring is exposed has the oxidized region, in a case where a plurality of the inductor wirings are provided, it is possible to increase an insulation resistance between the adjacent first extended wirings on the side surface. In addition, in a case where a plurality of the inductor components are disposed, it is possible to increase an insulation resistance between the first extended wirings of the adjacent inductor components.

Preferably, in an embodiment of the inductor component, the inductor wiring is a single layer.

According to the above embodiment, the inductor component can be thinned. In particular, since the short circuit is suppressed by the oxidized region, it is unnecessary to provide an insulating layer on the surface of the element body, the thin inductor component can be achieved, and the inductance acquisition efficiency can be improved.

Preferably, in an embodiment of the inductor component, a plurality of the inductor wirings are provided, and the plurality of inductor wirings are disposed on an identical plane parallel to the first principal surface and are electrically separated from each other.

According to the embodiment, an inductor array can be configured, and an inductances density can be increased.

Preferably, in an embodiment of the inductor component, the element body includes an immediately upper portion located between the first principal surface and an upper surface of the inductor wiring on a side of the first principal surface, a particle size D50 of the magnetic powder is 1/10 or more of a thickness of the immediately upper portion and is twice or less the thickness of the immediately upper portion, and a thickness of the element body is 300 μm or less.

According to the above embodiment, the thickness of the element body is 300 μm or less, and thus, the thin inductor component can be obtained. In addition, the particle size D50 of the magnetic powder is 1/10 or more of the thickness of the immediately upper portion, and thus, the magnetic permeability can be increased. Since the particle size D50 of the magnetic powder is twice or less the thickness of the immediately upper portion, particles of the magnetic powder are less likely to shed from the element body.

Preferably, in an embodiment of the inductor component, a particle size D50 of the magnetic powder in the overlapping region is larger than a particle size D50 of the magnetic powder in a non-overlapping region that is a region other than the overlapping region on the first principal surface.

According to the above embodiment, since the particle size D50 of the magnetic powder in the overlapping region is large, the magnetic powder having a large particle size is easily oxidized, and the oxidized region can be easily formed in the overlapping region. In addition, since the particle size D50 of the magnetic powder in the overlapping region is large, the magnetic powder having a large particle size can be disposed around the inductor wiring, and inductance can be secured.

Preferably, in an embodiment of the inductor component, an amount of Fe element in the oxidized region is larger than an amount of Fe element in the non-oxidized region.

According to the above embodiment, the amount of Fe element in the oxidized region is large, and thus, a large amount of Fe element can be disposed around the inductor wiring, and the inductance can be secured.

Preferably, in an embodiment of the inductor component, the element body includes a plurality of magnetic layers laminated in a direction orthogonal to the first principal surface, and one of the plurality of magnetic layers in contact with the inductor wiring is disposed along a part of an outer shape of the inductor wiring.

According to the above embodiment, the magnetic layer can be disposed along the periphery of the inductor wiring, and the inductance can be secured.

Preferably, in an embodiment of the inductor component, a particle size D50 of the magnetic powder in the oxidized region is larger than a particle size D50 of the magnetic powder in the non-oxidized region.

According to the above embodiment, the magnetic powder having a large particle size is easily oxidized, and the oxidized region can be easily formed.

In addition, an inductor component according to another aspect of the present disclosure includes an element body including magnetic powder and having a first principal surface and a second principal surface; an inductor wiring provided in the element body; a first vertical wiring that is provided in the element body, is connected to a first end portion of the inductor wiring, and extends to the first principal surface; a second vertical wiring that is provided in the element body, is connected to a second end portion of the inductor wiring, and extends to the first principal surface; a first external terminal connected to the first vertical wiring and exposed on the first principal surface; and a second external terminal connected to the second vertical wiring and exposed on the first principal surface. The magnetic powder contains an Fe element as a main component. The first principal surface has an oxidized region containing the Fe element at 65% by weight or more and an O element at 24% by weight or more among a plurality of particles of the magnetic powder, and a non-oxidized region in which a plurality of particles of the magnetic powder are exposed.

According to the above embodiment, the oxidized region prevents a short circuit between the first external terminal and the second external terminal through the magnetic powder on the first principal surface, and the non-oxidized region can suppress a decrease in strength of the element body and a decrease in inductance.

According to the inductor component according to one aspect of the present disclosure, it is possible to suppress the decrease in the element body strength and the decrease in the inductance while suppressing the short circuit between the external terminals.

DETAILED DESCRIPTION

Figure 1:
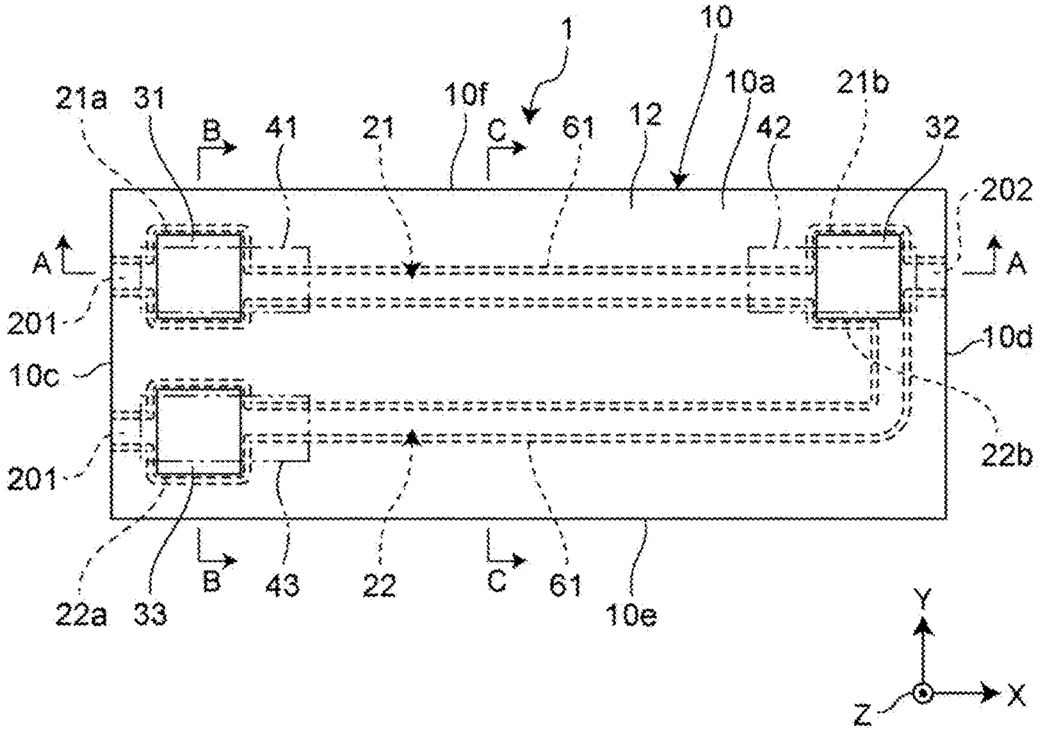
FIG. 1 is a plan view illustrating a first embodiment of an inductor component.

Hereinafter, an inductor component which is one aspect of the present disclosure will be described in detail with reference to embodiments illustrated in the drawings. Note that the drawings include some schematic views, and do not reflect actual dimensions and ratios in some cases.

First Embodiment (Configuration)

Figure 2A:
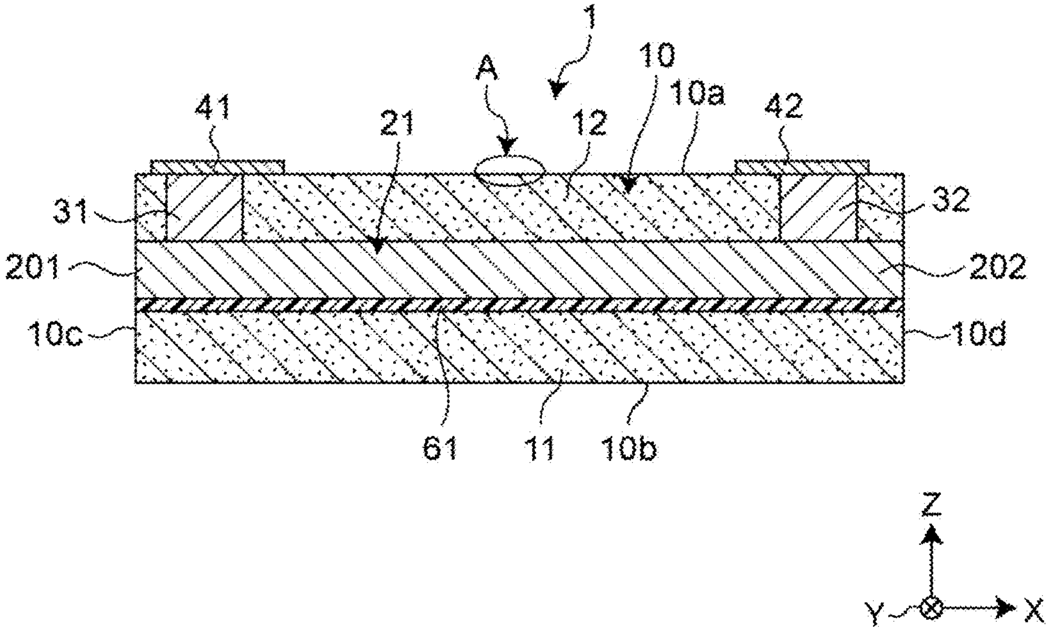
FIG. 2A is a sectional view taken along line A-A of FIG. 1.
Figure 2B:
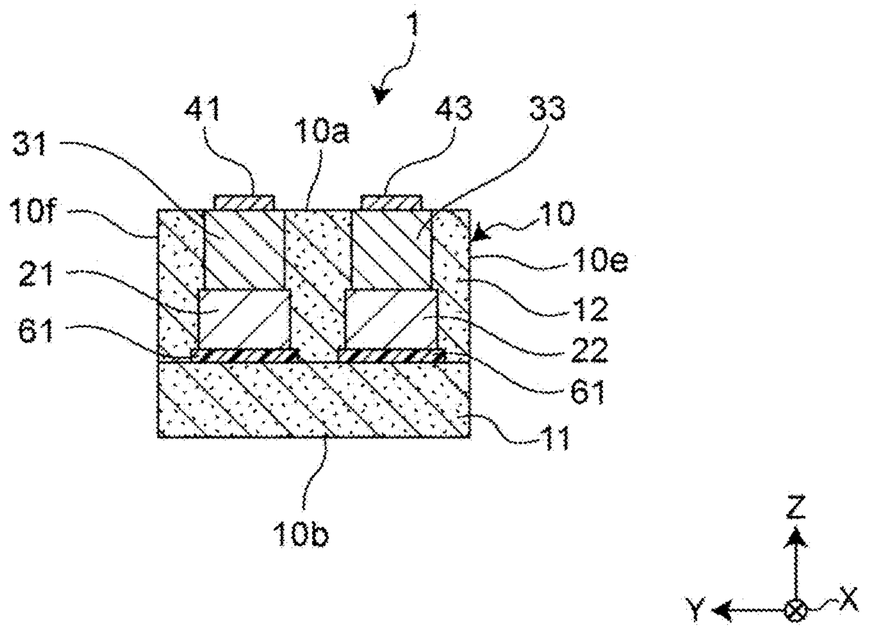
FIG. 2B is a sectional view taken along line B-B of FIG. 1.
Figure 2C:
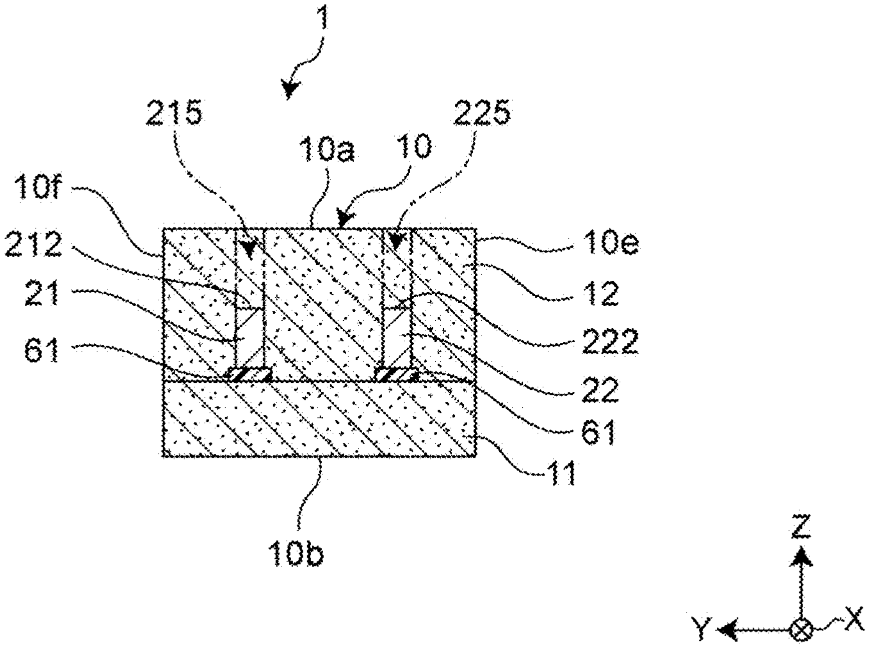
FIG. 2C is a sectional view taken along line C-C of FIG. 1.

FIG. 1 is a plan view illustrating a first embodiment of an inductor component. FIG. 2A is a sectional view taken along line A-A of FIG. 1. FIG. 2B is a sectional view taken along line B-B of FIG. 1. FIG. 2C is a sectional view taken along line C-C of FIG. 1.

An inductor component 1 is mounted on an electronic device such as a personal computer, a DVD player, a digital camera, a TV, a mobile phone, or car electronics, and is, for example, a component having a rectangular parallelepiped shape as a whole. Meanwhile, the shape of the inductor component 1 is not particularly limited, and may be a cylindrical shape, a polygonal columnar shape, a truncated cone shape, or a polygonal frustum shape.

As illustrated in FIGS. 1, 2A, 2B, and 2C, the inductor component 1 includes an element body 10; a first inductor wiring 21 and a second inductor wiring 22 provided in the element body 10; a first columnar wiring 31, a second columnar wiring 32, and a third columnar wiring 33 that are provided in the element body 10 with end surfaces thereof being exposed from a first principal surface 10*a* of the element body 10; and a first external terminal 41, a second external terminal 42, and a third external terminal 43 exposed on the first principal surface 10*a* of the element body 10. In FIG. 1, the first to third external terminals 41 to 43 are indicated by two-dot chain lines for convenience.

In the drawing, a thickness direction of the inductor component 1 is defined as a Z direction, a forward Z direction is defined as an upper side, and a reverse Z direction is defined as a lower side. In a plane orthogonal to the Z direction of the inductor component 1, a length direction of the inductor component 1 is defined as an X direction, and a width direction of the inductor component 1 is defined as a Y direction.

The element body 10 has a first principal surface 10*a* and a second principal surface 10*b*, and a first side surface 10*c*, a second side surface 10*d*, a third side surface 10*e*, and a fourth side surface 10*f* that are located between the first principal surface 10*a* and the second principal surface 10*b* and connect the first principal surface 10*a* and the second principal surface 10*b*.

The first principal surface 10*a* and the second principal surface 10*b* are disposed on opposite sides in the Z direction, the first principal surface 10*a* is disposed in the forward Z direction, and the second principal surface 10*b* is disposed in the reverse Z direction. The first side surface 10*c* and the second side surface 10*d* are disposed on opposite sides in the X direction, the first side surface 10*c* is disposed in the reverse X direction, and the second side surface 10*d* is disposed in the forward X direction. The third side surface 10*e* and the fourth side surface 10*f* are disposed on opposite sides in the Y direction, the third side surface 10*e* is disposed in the reverse Y direction, and the fourth side surface 10*f* is disposed in the forward Y direction.

The element body 10 includes a first magnetic layer 11 and a second magnetic layer 12 sequentially laminated along the forward Z direction. The first magnetic layer 11 and the second magnetic layer 12 each include magnetic powder and a resin containing the magnetic powder. The resin is, for example, an organic insulating material having an epoxy resin, a phenol resin, a liquid crystal polymer resin, a polyimide resin, an acrylic resin, or a mixture containing these resins. Examples of the magnetic powder include an FeSi alloy such as FeSiCr, an FeCo alloy, an Fe alloy such as NiFe, or an amorphous alloy thereof. Therefore, as compared with a magnetic layer made of ferrite, DC superposition characteristics can be improved by the magnetic powder, and particles of the magnetic powder are insulated from each other by the resin, so that a loss (iron loss) at high frequency is reduced.

The first inductor wiring 21 and the second inductor wiring 22 are disposed on a plane orthogonal to the Z direction between the first magnetic layer 11 and the second magnetic layer 12. Specifically, the first magnetic layer 11 exists in the reverse Z direction of the first inductor wiring 21 and the second inductor wiring 22, and the second magnetic layer 12 exists in a direction orthogonal to the forward Z direction and the forward Z direction of the first inductor wiring 21 and the second inductor wiring 22.

The first inductor wiring 21 extends straight along the X direction when viewed from the Z direction. The second inductor wiring 22 has a part extending straight along the X direction and the other part extending straight along the Y direction, that is, extends in an L shape, when viewed from the Z direction.

Thicknesses of the first and second inductor wirings 21 and 22 are preferably, for example, 40 μm or more and 120 μm or less (i.e., from 40 μm to 120 μm). As an example, the first and second inductor wirings 21 and 22 have the thickness of 35 μm, a wiring width of 50 μm, and a maximum space between the wirings of 200 μm.

The first inductor wiring 21 and the second inductor wiring 22 are made of a conductive material, for example, a metal material having a low electrical resistance such as Cu, Ag, Au, or Al. In the present embodiment, the inductor component 1 includes only one layer as each of the first and second inductor wirings 21 and 22, so that a height of the inductor component 1 can be reduced. Note that the inductor wiring may have a two-layer structure including a seed layer and an electrolytic plating layer, and may contain Ti or Ni as the seed layer.

A first end portion 21*a* of the first inductor wiring 21 is electrically connected to the first columnar wiring 31, and a second end portion 21*b* of the first inductor wiring 21 is electrically connected to the second columnar wiring 32. That is, the first inductor wiring 21 has pad portions each having a large line width at the first and second end portions 21*a* and 21*b*, and is directly connected to the first and second columnar wirings 31 and 32 at the pad portions.

A first end portion 22*a* of the second inductor wiring 22 is electrically connected to the third columnar wiring 33, and a second end portion 22*b* of the second inductor wiring 22 is electrically connected to the second columnar wiring 32. That is, the second inductor wiring 22 has a pad portions at the first end portion 22*a*, and is directly connected to the third columnar wiring 33 at the pad portion. The second end portion 22*b* of the second inductor wiring 22 is shared as the second end portion 21*b* of the first inductor wiring 21.

The first end portion 21*a* of the first inductor wiring 21 and the first end portion 22*a* of the second inductor wiring 22 are located on a side of the first side surface 10*c* of the element body 10 when viewed from the Z direction. The second end portion 21*b* of the first inductor wiring 21 and the second end portion 22*b* of the second inductor wiring 22 are located on a side of the second side surface 10*d* of the element body 10 when viewed from the Z direction.

Each of the first end portion 21*a* of the first inductor wiring 21 and the first end portion 22*a* of the second inductor wiring 22 is connected to a first extended wiring 201, and the first extended wiring 201 is exposed from the first side surface 10*c*. The second end portion 21*b* of the first inductor wiring 21 and the second end portion 22*b* of the second inductor wiring 22 are connected to a second extended wiring 202, and the second extended wiring 202 is exposed from the second side surface 10*d*.

The first extended wiring 201 and the second extended wiring 202 are wirings to be connected to a power supply wiring when electrolytic plating is additionally performed after shapes of the first and second inductor wirings 21 and 22 are formed in the process of manufacturing the inductor component 1. The additional electrolytic plating can be easily performed in an inductor substrate state before the inductor component 1 is diced into an individual piece by the power supply wiring, and a distance between the wirings can be narrowed. Since the distance between the wirings of the first and second inductor wirings 21 and 22 is narrowed by performing the additional electrolytic plating, magnetic coupling between the first and second inductor wirings 21 and 22 can be enhanced. Since the first extended wiring 201 and the second extended wiring 202 are provided, the strength can be secured at the time of cutting the element body 10 when the inductor component 1 is diced into the individual piece, and a yield at the time of manufacturing can be improved.

The first to third columnar wirings 31 to 33 extend in the Z direction from the inductor wirings 21 and 22 and penetrate the inside of the second magnetic layer 12. The columnar wiring corresponds to a "vertical wiring" described in the claims.

The first columnar wiring 31 extends from an upper surface of the first end portion 21*a* of the first inductor wiring 21 to the first principal surface 10*a* of the element body 10, and the end surface of the first columnar wiring 31 is exposed from the first principal surface 10*a* of the element body 10. The second columnar wiring 32 extends from an upper surface of the second end portion 21*b* of the first inductor wiring 21 to the first principal surface 10*a* of the element body 10, and the end surface of the second columnar wiring 32 is exposed from the first principal surface 10*a* of the element body 10. The third columnar wiring 33 extends from an upper surface of the first end portion 22*a* of the second inductor wiring 22 to the first principal surface 10*a* of the element body 10, and the end surface of the third columnar wiring 33 is exposed from the first principal surface 10*a* of the element body 10.

Therefore, the first columnar wiring 31, the second columnar wiring 32, and the third columnar wiring 33 extend straight in a direction orthogonal to the first principal surface 10*a* from the first inductor wiring 21 and the second inductor wiring 22 to the end surfaces exposed from the first principal surface 10*a*. Thus, the first external terminal 41, the second external terminal 42, and the third external terminal 43 can be connected to the first inductor wiring 21 and the second inductor wiring 22 at a shorter distance, and it is possible to achieve a decrease in resistance and an increase in inductance of the inductor component 1. The first to third columnar wirings 31 to 33 are made of a conductive material, for example, the same material as the inductor wirings 21 and 22.

In a case where the first and second inductor wirings 21 and 22 are covered with an insulating layer made of a non-magnetic material, the first to third columnar wirings 31 to 33 may be electrically connected to the first and second inductor wirings 21 and 22 through a via wiring penetrating the insulating layer. The via wiring is a conductor having a line width (diameter or sectional area) smaller than that of the columnar wiring. In this case, the "vertical wiring" described in the claims includes via the wiring and the columnar wiring.

The first to third external terminals 41 to 43 are provided on the first principal surface 10*a* of the element body 10. The first to third external terminals 41 to 43 are made of a conductive material, and each have a three-layer configuration in which, for example, Cu having low electrical resistance and excellent stress resistance, Ni having excellent corrosion resistance, and Au having excellent solder wettability and reliability are arranged in this order from the inside to the outside.

The first external terminal 41 is in contact with the end surface of the first columnar wiring 31 exposed from the first principal surface 10*a* of the element body 10 and is electrically connected to the first columnar wiring 31. Thus, the first external terminal 41 is electrically connected to the first end portion 21*a* of the first inductor wiring 21. The second external terminal 42 is in contact with the end surface of the second columnar wiring 32 exposed from the first principal surface 10*a* of the element body 10, and is electrically connected to the second columnar wiring 32. Thus, the second external terminal 42 is electrically connected to the second end portion 21*b* of the first inductor wiring 21 and the second end portion 22*b* of the second inductor wiring 22. The third external terminal 43 is in contact with the end surface of the third columnar wiring 33, is electrically connected to the third columnar wiring 33, and is electrically connected to the first end portion 22*a* of the second inductor wiring 22.

Each of a lower surface of the first inductor wiring 21 and a lower surface of the second inductor wiring 22 is covered with an insulating layer 61. The insulating layer 61 is made of an insulating material containing no magnetic body, and is made of a resin material such as an epoxy resin, a phenol resin, or a polyimide resin. Note that the insulating layer 61 may contain a non-magnetic filler such as silica, and in this case, the strength, processability, and electrical characteristics of the insulating layer 61 can be improved.

Figure 3:
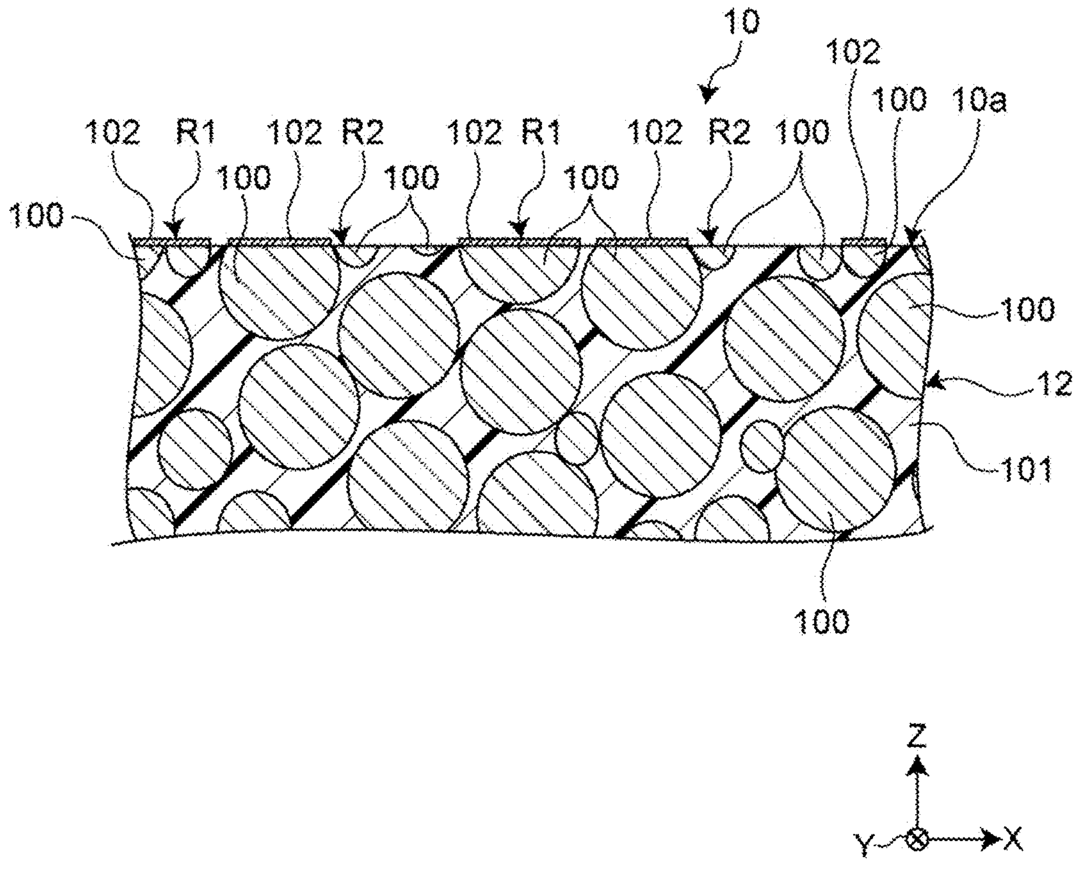
FIG. 3 is an enlarged view of a portion A in FIG. 2A.

FIG. 3 is an enlarged view of a portion A in FIG. 2A. As illustrated in FIG. 3, the first magnetic layer 11 and the second magnetic layer 12 include magnetic powder 100 and a resin 101 containing the magnetic powder 100. The magnetic powder 100 contains a Fe element as a main component. The fact that the magnetic powder 100 contains the Fe element as the main component means that the magnetic powder 100 is made of Fe alone or an Fe alloy in which the amount of Fe element is the largest in a total amount of elements, and is, for example, metal magnetic powder such as FeSi, FeSiCr, FeSiAl, or FeNi. Note that the magnetic powder 100 may have an amorphous structure or a crystal structure.

The first principal surface 10*a* of the element body 10 has an oxidized region R1 where an oxide film 102 formed by oxidizing a plurality of particles of the magnetic powder 100 are exposed, and a non-oxidized region R2 where a plurality of particles of the magnetic powder 100 are exposed. The oxidized region R1 refers to a region containing the Fe element at 65% by weight or more and an O element at 24% by weight or more. The non-oxidized region R2 refers to a region containing the Fe element at 65% by weight or more and the O element at less than 24% by weight. That is, in other words, the first principal surface 10*a* of the element body 10 has, on the plurality of particles of magnetic powder 100, the oxidized region R1 that contains the Fe element at 65% by weight or more and the O element at 24% by weight or more and the non-oxidized region R2 in which the plurality of particles of magnetic powder 100 are exposed.

For composition analysis of the oxidized region R1 and the non-oxidized region R2, a scanning electron microscope (SEM) image of the first principal surface 10*a* is analyzed by energy dispersive X-ray spectrometry (EDX). Specifically, in the SEM image, an image is captured at a magnification at which the plurality of particles of magnetic powder 100 are included, for example, 300 times, and point analysis is performed on the oxidized region R1 and the non-oxidized region R2 by EDX or composition analysis is performed by selecting only a corresponding area. Here, there is a case where C which is a resin component of the magnetic layer, a component derived from an insulating filler, a metal component used in vapor deposition, or the like is detected as noise, and a percentage of a corresponding composition (the Fe element or the O element) is calculated using a denominator obtained by excluding these components. As separation between the element included in the denominator as the composition of the magnetic powder and the noise, a section of a central portion of the element body is exposed in advance by polishing, and a composition detected at cut surfaces of the plurality of particles of the magnetic powder exposed at the section is used as a reference, and a composition that is not detected at the reference is defined as the noise.

According to the above configuration, the oxidized region R1 prevents a short circuit between the first external terminal 41 and the second external terminal 42 and a short circuit between the third external terminal 43 and the second external terminal 42 through the magnetic powder 100 on the first principal surface 10*a*, and the non-oxidized region R2 can suppress a decrease in strength and a decrease in inductance of the element body 10.

Specifically, the first external terminal 41 and the second external terminal 42 are prevented from being short-circuited through the magnetic powder 100 on the first principal surface 10*a* since the oxidized region R1 is provided when a filling rate of the magnetic powder 100 is increased in order to improve the inductance. Since the oxidized region R1 is provided, a thickness of the inductor component 1 can be reduced as compared with a case where an insulating resin film is provided on the first principal surface 10*a*. For example, the oxidized region R1 is discontinuously formed, and specifically, the oxidized region R1 is formed in a variegated manner. On the other hand, since the non-oxidized region R2 is provided, it is possible to suppress the decrease in strength and deterioration in magnetic characteristics of the element body 10 caused by the oxide film.

In addition, the inductor component 1 can be thinned since the first inductor wiring 21 and the second inductor wiring 22 each have one layer. In particular, since the short circuit is suppressed by the oxidized region R1, it is unnecessary to provide an insulating layer on the surface of the element body 10, the thin inductor component 1 can be achieved, and the inductance acquisition efficiency can be improved.

As illustrated in FIG. 3, the magnetic powder 100 in the oxidized region R1 includes a magnetic powder particle in direct contact with the resin 101. Specifically, the magnetic powder 100 includes a magnetic powder particle that is not coated with the oxide film in advance. According to the above configuration, the magnetic powder 100 in the oxidized region R1 is in direct contact with the resin 101, a close contact property between the magnetic powder 100 and the resin 101 is improved, and it is possible to more effectively suppress the decrease in the strength of the element body and the decrease in the inductance.

Alternatively, the magnetic powder 100 in the oxidized region R1 includes a magnetic powder particle in contact with the resin 101 with the oxide film interposed therebetween although not illustrated. Specifically, the magnetic powder 100 includes a magnetic powder particle coated with the oxide film in advance. According to the above configuration, the magnetic powder 100 in the oxidized region R1 comes into contact with the resin 101 with the oxide film interposed therebetween, and thus, it is possible to more effectively suppress the short circuit. In addition, the magnetic powder 100 in the oxidized region R1 may include a magnetic powder particle in which a part of the surface embedded in the resin 101 is covered with the oxide film and the remaining part is not covered with the oxide film. That is, the magnetic powder 100 in the oxidized region R1 may include a magnetic powder particle that has a part in direct contact with the resin 101 and a part in contact with the resin 101 with the oxide film interposed therebetween.

Preferably, a ratio of a reflectance of a wavelength of 600 nm or more and 800 nm or less (i.e., from 600 nm to 800 nm) relative to a reflectance of a wavelength of less than 600 nm is higher in the oxidized region R1 than in the non-oxidized region R2. According to the above configuration, red is reflected more greatly by the oxidized region R1 than by the non-oxidized region R2. Therefore, since the oxidized region R1 appears to be red (warm color), it is possible to easily grasp that the oxidized region R1 is formed visually or by an appearance inspection apparatus or the like, and to confirm that the oxidized region R1 has a short-circuit resistance from the appearance.

Preferably, the oxide film 102 is formed on the cut surfaces of particles of the magnetic powder 100. According to the above configuration, in a case where the element body 10 is ground to reduce a thickness of the element body, a particle of the magnetic powder 100 is cut to expose a cut surface of the particle of the magnetic powder 100, but the short-circuit resistance can be improved since the oxide film 102 is formed on the cut surface of the particle of the magnetic powder 100.

On the other hand, there is known magnetic powder whose surface is coated with an organic or inorganic substance such as phosphoric acid or SiO2 to improve an insulating property. When such magnetic powder is disposed on the outermost surface, an insulating property of a chip surface can be improved. However, it is necessary to adjust the thickness by grinding an element body (magnetic layer) in order to manufacture a thin inductor component. In this case, a surface protective film on the surface of the magnetic powder is peeled off to expose the inside of the magnetic powder, so that the short-circuit resistance decreases. Therefore, the oxide film 102 is formed on the inside of the exposed particle of the magnetic powder 100 in which an insulation resistance decreases in the present embodiment, so that the short-circuit resistance is improved, and the thickness is not unnecessarily increased. However, the oxide film 102 may be formed on a surface, which is not the cut surface, of a particle of the magnetic powder 100. As can be assumed from the above, a part of the particle of the magnetic powder 100 embedded in the resin 101 in the oxidized region R1 is not limited to the case of being coated with the oxidized oxide film 102 obtained by oxidizing the magnetic powder 100, and may be coated with an organic or inorganic substance such as phosphoric acid or SiO2.

Preferably, a thickness of the oxide film 102 is smaller than a particle size D50 of the magnetic powder 100. According to the above configuration, the excessive progress of oxidation causes a problem due to the decrease in the strength of the element body 10 or shedding of particles of particles of the magnetic powder 100, but the problem can be avoided since the oxide film 102 is thinner than one particle of the magnetic powder 100.

Here, the particle size D50 of the magnetic powder 100 is measured from an SEM image of a traverse section of a central portion in the longitudinal direction of the element body 10 of the inductor component unless otherwise specified. The SEM image used at this time preferably includes ten or more particles of the magnetic powder 100, and is acquired at a magnification of, for example, 2000 times. The SEM image as described above is acquired at three or more locations from the traverse section, the magnetic powder 100 and the others are classified by binarization or the like, circle-equivalent diameters of particles of the magnetic powder 100 in the SEM images are calculated, and an intermediate value (median diameter) when the circle-equivalent diameters are arranged in order of the size is defined as the particle size D50 of the magnetic powder 100. In addition, the number of particles is accumulated in ascending order of the circle-equivalent diameter, and a circle-equivalent diameter when the number exceeds 90% of the total for the first time is defined as a particle size D90 of the magnetic powder 100.

As illustrated in FIG. 2C, the element body 10 includes a first immediately upper portion 215 located between the first principal surface 10*a* and an upper surface 212 of the first inductor wiring 21 on the side of the first principal surface 10*a*, and the second inductor wiring 22 has a second immediately upper portion 225 located between the first principal surface 10*a* and an upper surface 222 of the second inductor wiring 22 on the side of the first principal surface 10*a*. Preferably, the particle size D50 of the magnetic powder 100 is 1/10 or more of a thickness of each of the first and second immediately upper portions 215 and 225 and twice or less the thickness of each of the first and second immediately upper portions 215 and 225 (i.e., from 1/10 of a thickness of each of the first and second immediately upper portions 215 and 225 to twice the thickness of each of the first and second immediately upper portions 215 and 225), and the thickness of the element body 10 is 300 μm or less.

According to the above configuration, the thin inductor component 1 can be obtained since the thickness of the element body 10 is 300 μm or less. In addition, the particle size D50 of the magnetic powder 100 is 1/10 or more of the thickness of each of the first and second immediately upper portions 215 and 225, the magnetic permeability can be increased. Since the particle size D50 of the magnetic powder 100 is twice or less the thickness of each of the first and second immediately upper portions 215 and 225, particles of the magnetic powder 100 are less likely to shed from the element body 10.

On the other hand, when the particle size D50 of the magnetic powder 100 is smaller than 1/10 of the thickness of each of the first and second immediately upper portions 215 and 225, it is difficult to increase the magnetic permeability. When the particle size D50 of the magnetic powder 100 is larger than twice the thickness of each of the first and second immediately upper portions 215 and 225, a retaining force of the resin 101 around the magnetic powder 100 decreases, and particles of the magnetic powder 100 are likely to be shed, and as a result, the first and second inductor wirings 21 and 22 are exposed when the particles of the magnetic powder 100 have been shed, and the strength of the element body 10 decreases.

Preferably, the particle size D50 of the magnetic powder 100 in the oxidized region is larger than the particle size D50 of the magnetic powder 100 in the non-oxidized region. According to the above configuration, the magnetic powder 100 having a large particle size is easily oxidized, and the oxidized region can be easily formed.

Preferably, the second principal surface 10*b* has the oxidized region R1, and an area of the oxidized region R1 on the second principal surface 10*b* is larger than an area of the oxidized region R1 on the first principal surface 10*a*. According to the above configuration, in a case where no external terminal is present on the second principal surface 10*b*, for example, the oxidized region R1 can be formed on the entire second principal surface 10*b*, and a short circuit on the second principal surface 10*b* can be suppressed.

Preferably, the second principal surface 10*b* has the oxidized region R1, and the thickness of the oxide film 102 on the second principal surface 10*b* is thinner than the thickness of the oxide film 102 on the first principal surface 10*a*. According to the above configuration, in a case where no external terminal is present on the second principal surface 10*b*, a short circuit on the second principal surface 10*b* is less likely to occur than a short circuit on the first principal surface 10*a*, and thus, the thickness of the oxide film 102 on the second principal surface 10*b* can be reduced, whereby the strength of the element body 10 can be maintained.

Preferably, the oxidized region R1 is provided only on the first principal surface 10*a*. According to the above configuration, the area of the oxidized region R1 can be minimized, and thus, it is possible to increase the insulating property while ensuring the strength of the element body 10. For example, such a structure can be achieved by pasting a protective film (tape) to the second principal surface 10*b* in a manufacturing process.

Preferably, the oxidized region R1 is provided only on the first principal surface 10*a* and at least one of the side surfaces 10*c* to 10*f*. According to the above configuration, the area of the oxidized region R1 can be suppressed, and thus, it is possible to increase the insulating property while ensuring the strength of the element body 10.

Preferably, the first side surface 10*c* from which the first extended wiring 201 is exposed has the oxidized region R1. According to the above configuration, in a case where the plurality of inductor wirings 21 and 22 are provided, it is possible to increase an insulation resistance between the adjacent first extended wirings 201 and 201 on the first side surface 10*c*. In addition, in a case where a plurality of the inductor components 1 are disposed, it is possible to increase an insulation resistance between the first extended wirings 201 and 201 of the adjacent inductor components 1. Similarly, the second side surface 10*d* from which the second extended wiring 202 is exposed may have the oxidized region R1.

Preferably, a plurality of inductor wirings are provided, and the plurality of inductor wirings are disposed on the same plane parallel to the first principal surface 10*a* and are electrically separated from each other. According to the above configuration, an inductor array can be configured, and an inductance density can be increased.

Preferably, a plurality of inductor wirings are provided, and the plurality of inductor wirings are disposed in the direction orthogonal to the first principal surface 10*a* and are electrically connected to each other. According to the above configuration, the inductance can be improved by the plurality of laminated inductor wirings.

(Manufacturing Method)

Next, a manufacturing method of the inductor component 1 will be described. FIGS. 4A to 4J correspond to a section (FIG. 2B) taken along line B-B of FIG. 1.

Figure 4A:
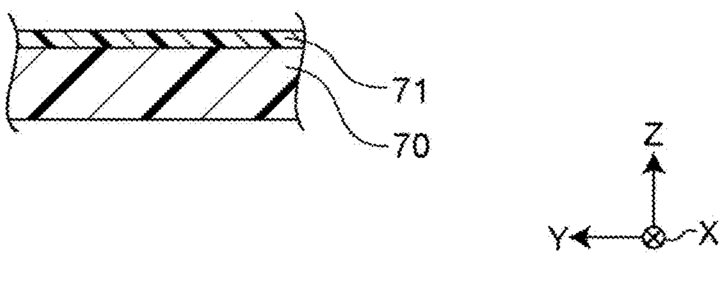
FIG. 4A is an explanatory view for describing a method of manufacturing the inductor component.

As illustrated in FIG. 4A, a base substrate 70 is prepared. The base substrate 70 is made of, for example, an inorganic material such as ceramic, glass, or silicon. A first insulating layer 71 is applied onto a principal surface of the base substrate 70, and the first insulating layer 71 is cured.

Figure 4B:
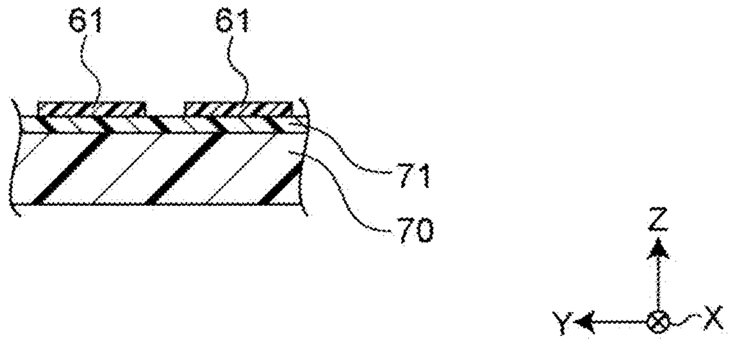
FIG. 4B is an explanatory view for describing the method of manufacturing the inductor component.

As illustrated in FIG. 4B, a second insulating layer 61 is applied onto the first insulating layer 71, and a predetermined pattern is formed and cured using a photolithography method.

Figure 4C:
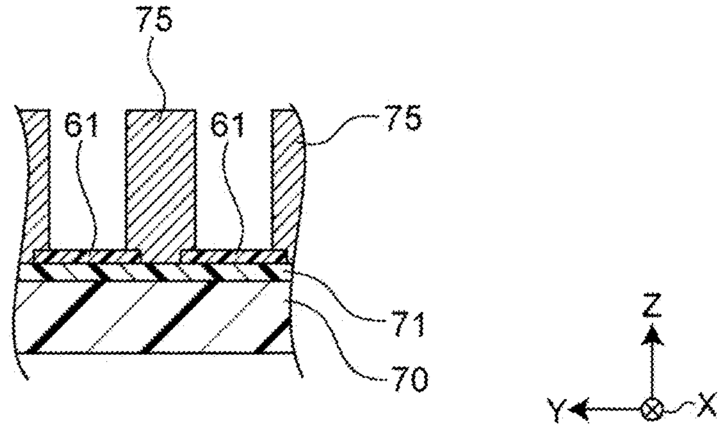
FIG. 4C is an explanatory view for describing the method of manufacturing the inductor component.

As illustrated in FIG. 4C, a seed layer (not illustrated) is formed on the first insulating layer 71 and the second insulating layer 61 by a known method such as a sputtering method or a vapor deposition method. Thereafter, a dry film resist (DFR) 75 is pasted, and a predetermined pattern is formed on the DFR 75 using a photolithography method. The predetermined pattern is through holes corresponding to positions where the first inductor wiring 21 and the second inductor wiring 22 are provided on the second insulating layer 61.

Figure 4D:
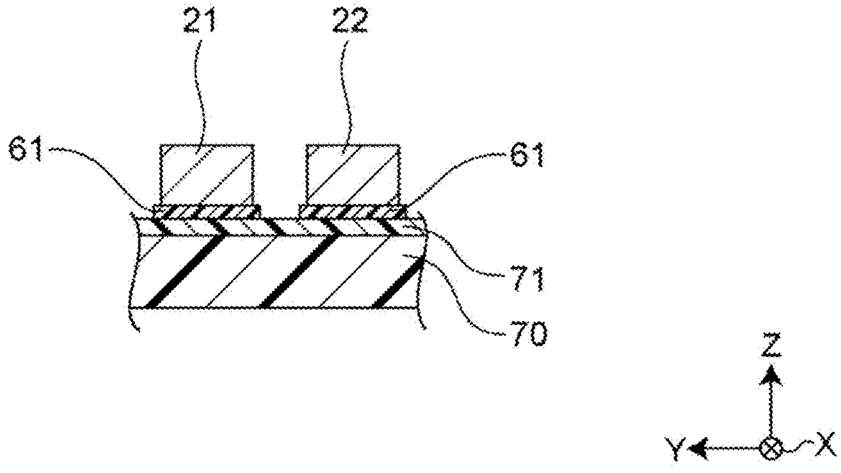
FIG. 4D is an explanatory view for describing the method of manufacturing the inductor component.

As illustrated in FIG. 4D, the first inductor wiring 21 and the second inductor wiring 22 are formed on the second insulating layer 61 by an electrolytic plating method while supplying power to the seed layer. Thereafter, the DFR 75 is peeled off, and the seed layer is etched. In this manner, the first inductor wiring 21 and the second inductor wiring 22 are formed on the principal surface of the base substrate 70.

Figure 4E:
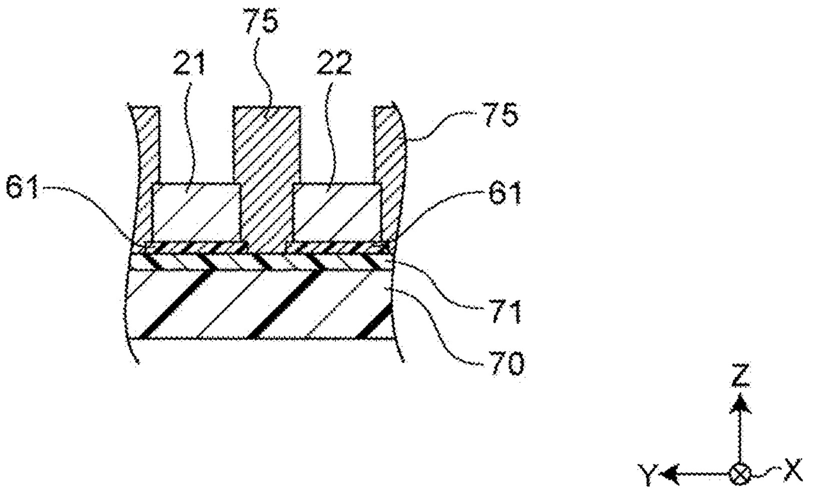
FIG. 4E is an explanatory view for describing the method of manufacturing the inductor component.

As illustrated in FIG. 4E, the DFR 75 is pasted again, and a predetermined pattern is formed on the DFR 75 using a photolithography method. The predetermined pattern is through holes corresponding to positions where the first columnar wiring 31, the second columnar wiring 32, and the third columnar wiring 33 on the first inductor wiring 21 and the second inductor wiring 22 are provided.

Figure 4F:
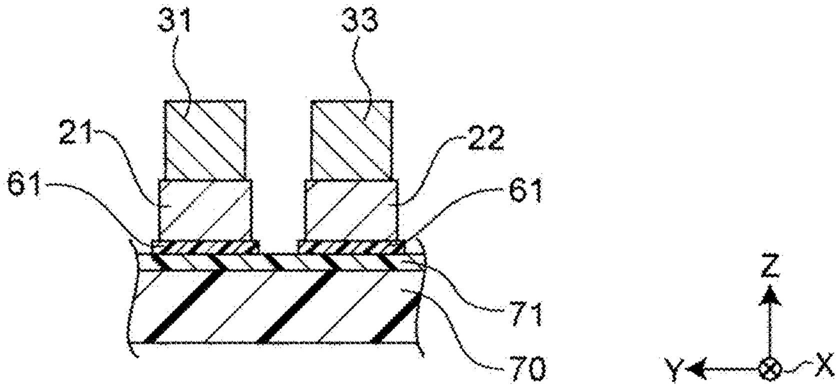
FIG. 4F is an explanatory view for describing the method of manufacturing the inductor component.

As illustrated in FIG. 4F, the first columnar wiring 31, the second columnar wiring 32, and the third columnar wiring 33 are formed on the first inductor wiring 21 and the second inductor wiring 22 by electrolytic plating. Thereafter, the DFR 75 is peeled off. Note that a seed layer may be used for electrolytic plating, and in this case, it is necessary to etch the seed layer. In addition, the seed layer at the time of forming the first inductor wiring 21 and the second inductor wiring 22 may be left without being etched to form the first columnar wiring 31, the second columnar wiring 32, and the third columnar wiring 33 by supplying power via this seed layer, and in this case, it is also necessary to etch the seed layer.

Figure 4G:
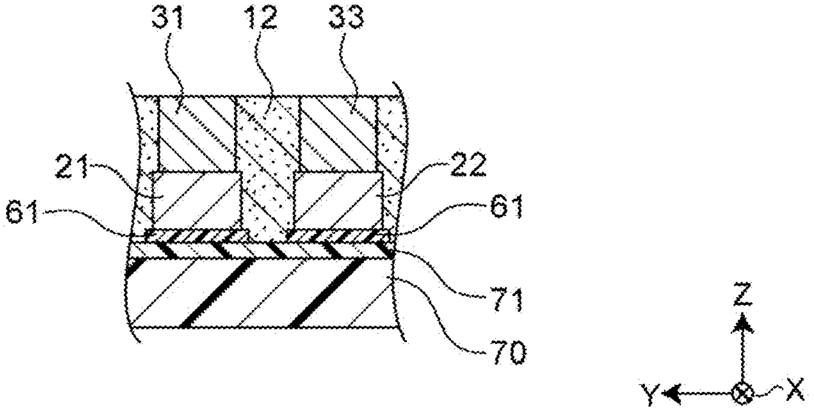
FIG. 4G is an explanatory view for describing the method of manufacturing the inductor component.

As illustrated in FIG. 4G, a magnetic sheet, which is to be the second magnetic layer 12, is pressure-bonded from above the principal surface of the base substrate 70 toward the first inductor wiring 21 and the second inductor wiring 22 to cover the first inductor wiring 21, the second inductor wiring 22, the first columnar wiring 31, the second columnar wiring 32, and the third columnar wiring 33 with the second magnetic layer 12. Thereafter, an upper surface of the second magnetic layer 12 is ground to expose the end surfaces of the first columnar wiring 31, the second columnar wiring 32, and the third columnar wiring 33 from the upper surface of the second magnetic layer 12. Note that there is a case where a surface protective film made of an inorganic material, such as glass or silicon, a resin, or the like is used in order to reduce deterioration of the magnetic powder due to an environmental load. In the case where the magnetic powder is covered with the surface protective film in this manner, the surface protective film is peeled off by grinding to enable oxidization of the surface of the magnetic powder.

Figure 4H:
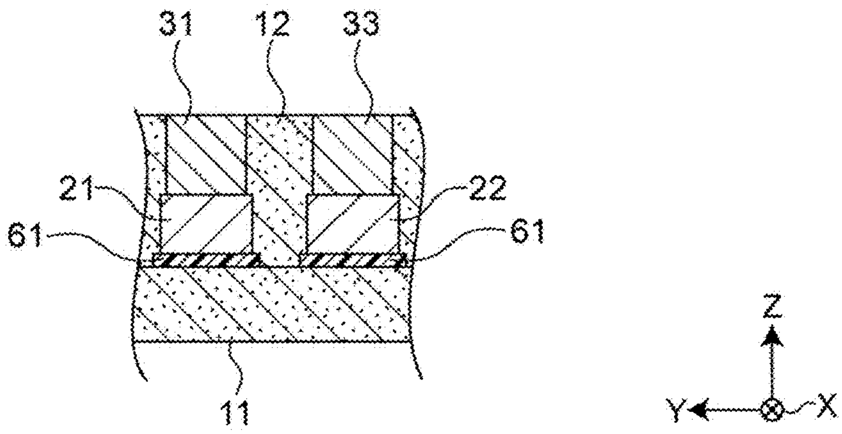
FIG. 4H is an explanatory view for describing the method of manufacturing the inductor component.

As illustrated in FIG. 4H, the base substrate 70 and the first insulating layer 71 are removed by polishing. At this time, the base substrate 70 and the first insulating layer 71 may be removed by peeling with the first insulating layer 71 as a peeling layer. Thereafter, another magnetic sheet, which is to be the first magnetic layer 11, is pressure-bonded from below the first inductor wiring 21 and the second inductor wiring 22 toward the first inductor wiring 21 and the second inductor wiring 22 to cover the first inductor wiring 21 and the second inductor wiring 22 with the first magnetic layer 11. Thereafter, the first magnetic layer 11 is ground to have a predetermined thickness.

Figure 4I:
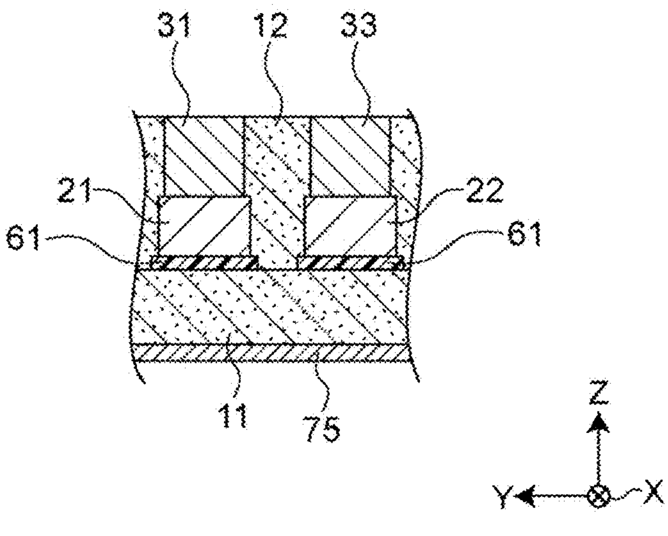
FIG. 4I is an explanatory view for describing the method of manufacturing the inductor component.

As illustrated in FIG. 4I, the protective film 75 such as a tape is attached to a lower surface of the first magnetic layer 11, and an oxidation treatment is performed on the second magnetic layer 12. Specifically, a baking treatment is performed by humidification. At this time, the baking treatment is performed at such temperature and humidity as to facilitate oxidization of magnetic powder having a large particle size and suppress oxidization of magnetic powder having a small particle size. Thus, the oxide film can be formed on the magnetic powder having a large particle size, and the oxidized region and the non-oxidized region can be easily formed. Instead of the baking treatment, the surface of the second magnetic layer 12 may be washed with water and dried. In this case, it is possible to form the oxide film on the magnetic powder having a large particle size and to easily form the oxidized region and the non-oxidized region by adjusting a washing time or a drying time.

Figure 4J:
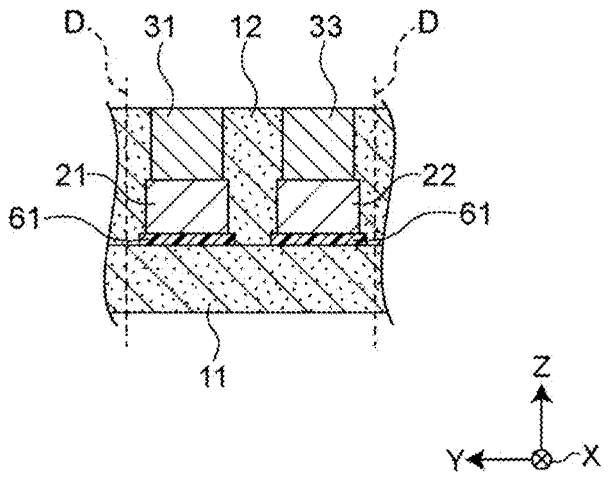
FIG. 4J is an explanatory view for describing the method of manufacturing the inductor component.

As illustrated in FIG. 4J, the protective film 75 is removed, and the inductor component 1 is diced into an individual piece at a cutting line D. Thereafter, a metal film is formed on the columnar wiring 31 to 33 by electroless plating to form the first external terminal 41, the second external terminal 42, and the third external terminal 43. Thus, the inductor component 1 is manufactured as illustrated in FIG. 2B.

EXAMPLES

Figure 5A:
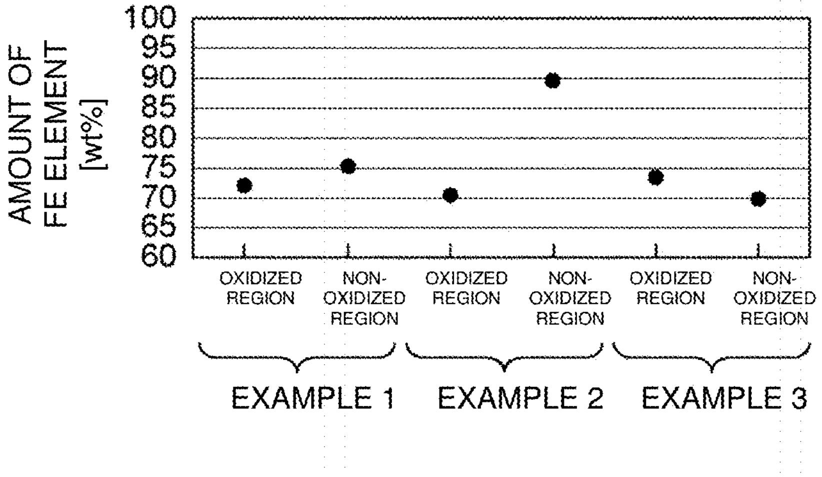
FIG. 5A is a graph illustrating the amount of Fe element [wt %] of each of an oxidized region and a non-oxidized region in Examples 1 to 3.
Figure 5B:
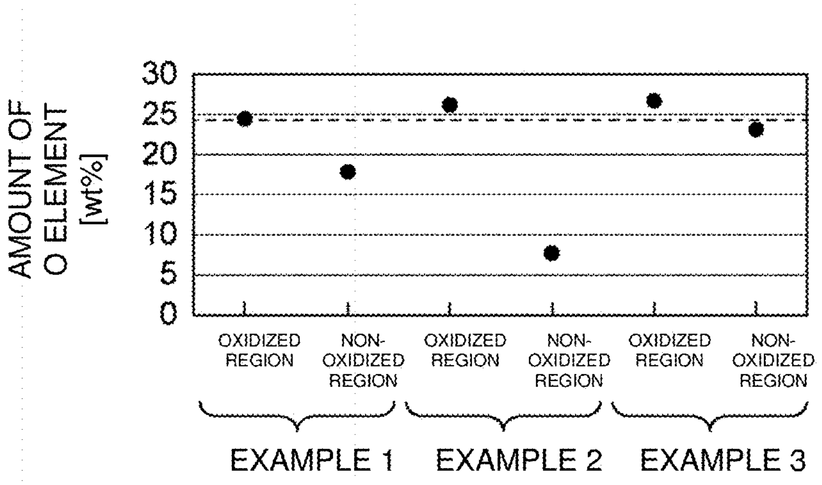
FIG. 5B is a graph illustrating the amount of 0 element [wt %] of each of the oxidized region and the non-oxidized region in Examples 1 to 3.

Next, the amount of Fe element and the amount of 0 element in each of an oxidized region and a non-oxidized region were obtained in Examples 1 to 3. FIG. 5A is a graph illustrating the amount of Fe element [wt %] in each of the oxidized region and the non-oxidized region in Examples 1 to 3. FIG. 5B is a graph illustrating the amount of 0 element [wt %] in each of the oxidized region and the non-oxidized region in Examples 1 to 3.

In Example 1, a composition of magnetic powder is FeSi, and a particle size D50 of the magnetic powder is 15 μm. In Example 2, a composition of magnetic powder is FeSi, the amount of Fe in Example 2 is 1.2 assuming the amount of Fe in Example 1 as 1, and a particle size D50 of the magnetic powder is 16 μm. In Example 3, a composition of magnetic powder is FeSiCr, the amount of Fe in Example 3 is 0.9 assuming the amount of Fe in Example 1 as 1, and a particle size D50 of the magnetic powder is 3 μm.

In Example 1, the Fe element in the oxidized region was 72% by weight, and the Fe element in the non-oxidized region was 75% by weight as illustrated in FIG. 5A. In Example 2, the Fe element in the oxidized region was 71% by weight, and the Fe element in the non-oxidized region was 90% by weight. In Example 3, the Fe element in the oxidized region was 73% by weight, and the Fe element in the non-oxidized region was 70% by weight.

In Example 1, the O element in the oxidized region was 24% by weight, and the O element in the non-oxidized region was 18% by weight as illustrated in FIG. 5B. In Example 2, the O element in the oxidized region was 26% by weight, and the O element in the non-oxidized region was 8% by weight. In Example 3, the O element in the oxidized region was 27% by weight, and the O element in the non-oxidized region was 23% by weight. In FIG. 5B, a position of 24% by weight is indicated by a dotted line.

Therefore, the oxidized region contains the Fe element at 65% by weight or more and the O element at 24% by weight or more. The non-oxidized region contains the Fe element at 65% by weight or more and the O element at less than 24% by weight.

Second Embodiment

Figure 6:
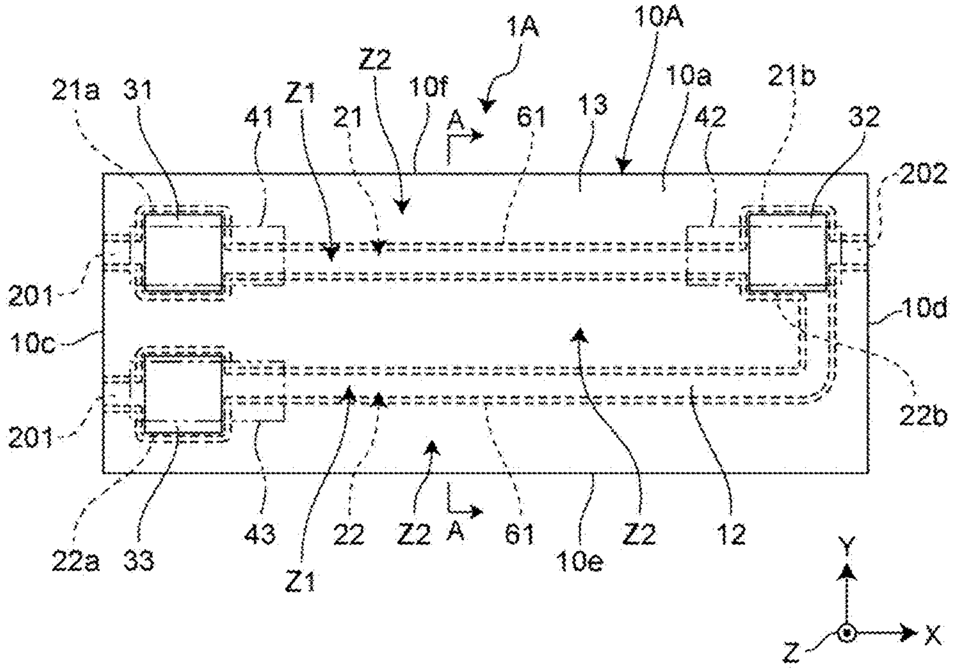
FIG. 6 is a plan view illustrating a second embodiment of the inductor component.

FIG. 6 is a plan view illustrating a second embodiment of the inductor component. The second embodiment is different from the first embodiment in terms of a configuration of an element body. This different configuration will be described hereinafter. Since the other structures are the same as those of the first embodiment, the same reference signs as those of the first embodiment will be given, and the description thereof will be omitted.

As illustrated in FIG. 6, in an inductor component 1A of the second embodiment, the first principal surface 10*a* of the element body 10A has an overlapping region Z1 overlapping the first and second inductor wirings 21 and 22 closest to the first principal surface 10*a* when viewed from a direction orthogonal to the first principal surface 10*a*, and a non-overlapping region Z2 that is a region other than the overlapping region Z1. The oxidized region R1 is located in the overlapping region Z1. The overlapping region Z1 may include the non-oxidized region R2 as a part thereof.

According to the above configuration, the oxidized region R1 is disposed along the first and second inductor wirings 21 and 22 when viewed from the direction orthogonal to the first principal surface 10*a*, it is possible to increase an insulation resistance between the adjacent inductor wirings 21 and 22 on the first principal surface 10*a*. In addition, in a case where a plurality of the inductor components 1A are disposed, it is possible to increase an insulation resistance between the inductor wirings of the adjacent inductor components 1A. In addition, it is possible to suppress the decrease in the strength of the element body due to the oxidation by limiting the oxidized region.

Figure 7:
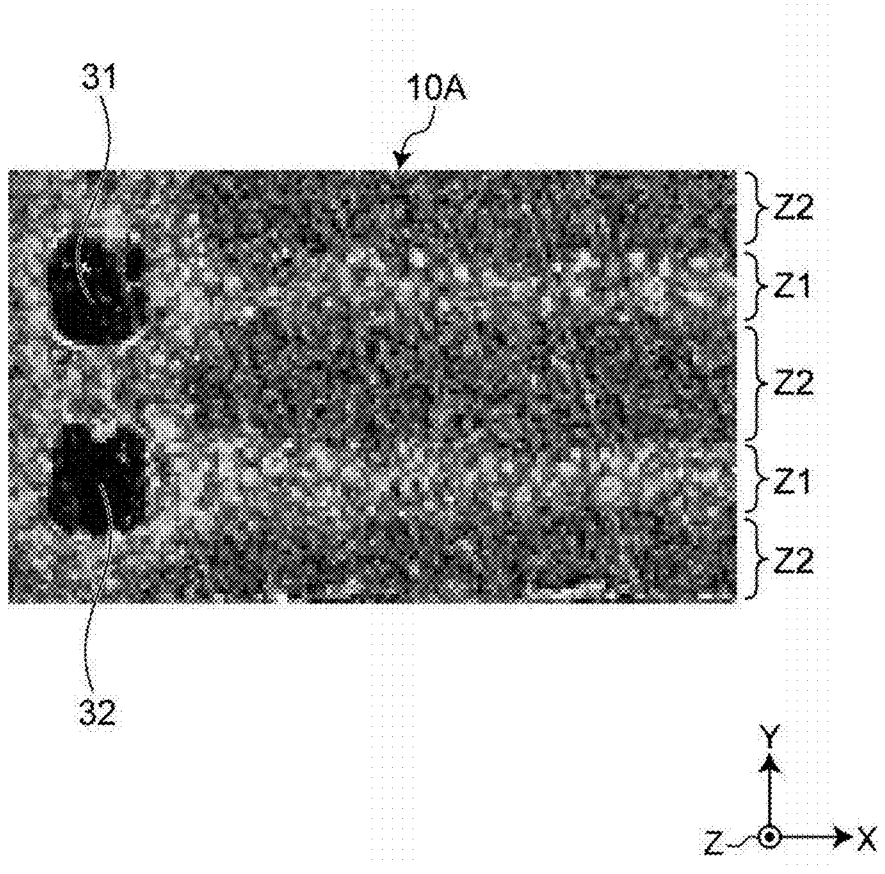
FIG. 7 is an image view obtained by capturing an image of the inductor component from a planar direction and adjusting the brightness.

FIG. 7 is an image view obtained by capturing an image of the inductor component 1A from a planar direction and adjusting the brightness. As illustrated in FIG. 7, the overlapping region Z1 appears brighter than the non-overlapping region Z2 due to the presence of the oxidized region R1. In practice, the overlapping region Z1 appears to be red.

Figure 8:
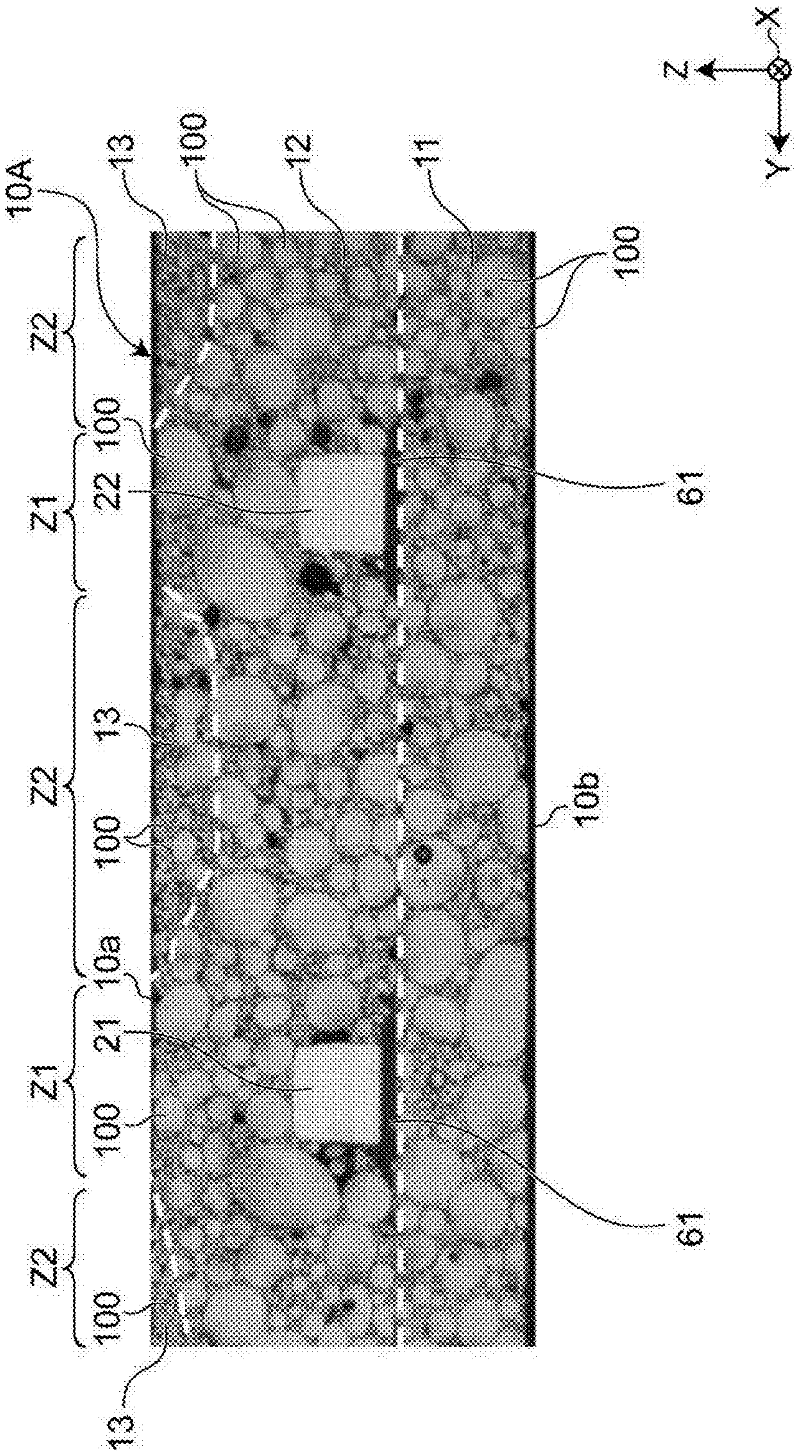
FIG. 8 is an image view corresponding to a section along line A-A of FIG. 6.

FIG. 8 is an image view corresponding to a section along line A-A of FIG. 6. As illustrated in FIG. 8, a particle size D50 of the magnetic powder 100 in the overlapping region Z1 is larger than a particle size D50 of the magnetic powder 100 in the non-overlapping region Z2. Here, the particle size of the magnetic powder 100 is measured from an SEM image on the first principal surface 10*a* without using a section on any surface of the inductor component. A specific method of calculating the particle size from the SEM image is similar to the method of calculating the particle size of the magnetic powder 100 described in the first embodiment.

According to the above configuration, since the particle size D50 of the magnetic powder 100 in the overlapping region Z1 is large, the magnetic powder 100 having a large particle size is easily oxidized, and the oxidized region R1 can be easily formed in the overlapping region Z1. In addition, since the particle size D50 of the magnetic powder 100 in the overlapping region Z1 is large, the magnetic powder 100 having a large particle size can be disposed around the inductor wiring, and inductance can be secured.

Examples of magnetic powder used for the non-oxidized region R2 include magnetic powder which has a particle size D50 of 2 μm or smaller and is made of a FeSiCr alloy or the like, and in which a passivation film other than an Fe film is easily formed on a surface of the magnetic powder. In the image view of FIG. 8, magnetic powder having a particle size D50 of 1.4 μm and a particle size D90 of 3.1 μm is used. On the other hand, examples of magnetic powder used for the oxidized region R1 include magnetic powder having a particle size D50 of 5 μm or larger and having a high composition ratio of Fe, such as an FeSi alloy. In the image view of FIG. 8, magnetic powder having a particle size D50 of 6.8 μm and a particle size D90 of 14.0 μm is used.

Preferably, the amount of Fe element in the oxidized region R1 is larger than the amount of Fe element in the non-oxidized region R2. Specifically, an oxide film in the oxidized region R1 is iron oxide. According to the above configuration, the amount of Fe element in the oxidized region R1 is large, and thus, a large amount of Fe element can be disposed around the first and second inductor wirings 21 and 22, and the inductance can be secured.

Preferably, the element body 10A includes the first magnetic layer 11, the second magnetic layer 12, and the third magnetic layer 13 laminated in the direction orthogonal to the first principal surface 10*a*. In FIG. 8, boundaries among the first magnetic layer 11, the second magnetic layer 12, and the third magnetic layer 13 are drawn by dotted lines. The second magnetic layer 12 mainly includes the magnetic powder 100 having a large particle size, and the third magnetic layer 13 mainly includes the magnetic powder 100 having a small particle size. The second magnetic layer 12 in contact with the first and second inductor wirings 21 and 22 is disposed along a part of an outer shape of each of the first and second inductor wirings 21 and 22. According to the above configuration, the second magnetic layer 12 can be disposed along the periphery of the first and second inductor wirings 21 and 22, and the inductance can be secured.

Figure 9:
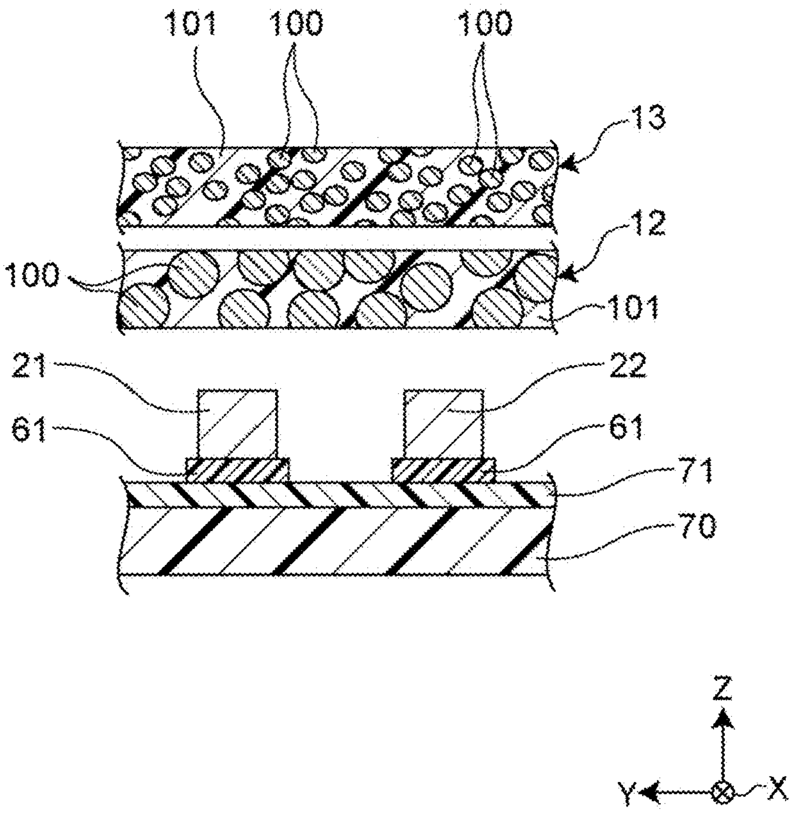
FIG. 9 is an explanatory view for describing a method of manufacturing the inductor component.

A manufacturing method of the inductor component 1A at this time will be described. FIGS. 4A to 4F are similar to those in the first embodiment. Thereafter, as illustrated in FIG. 9, a magnetic sheet mainly including the magnetic powder 100 having a large particle size as the second magnetic layer 12 is pressure-bonded from above the first inductor wiring 21 and the second inductor wiring 22 to cover the first inductor wiring 21 and the second inductor wiring 22 with the second magnetic layer 12. Then, a magnetic sheet mainly including the magnetic powder 100 having a small particle size as the third magnetic layer 13 is pressure-bonded from above the magnetic sheet of the second magnetic layer 12 to cover the second magnetic layer 12 with the third magnetic layer 13. At this time, the second magnetic layer 12 and the third magnetic layer 13 protrude upward in a portion where the first inductor wiring 21 and the second inductor wiring 22 are present. That is, principal surfaces of the second magnetic layer 12 and the third magnetic layer 13 have an uneven shape so as to protrude in the overlapping region Z1 and be recessed in the non-overlapping region Z2.

Thereafter, a part of each of the second magnetic layer 12 and the third magnetic layer 13 is ground. At this time, the grinding is performed such that the second magnetic layer 12 forms the first principal surface 10*a* in the overlapping region Z1 and the third magnetic layer 13 forms the first principal surface 10*a* in the non-overlapping region Z2 as illustrated in FIG. 8. Thus, the principal surface of the second magnetic layer 12 becomes flat in the overlapping region Z1 and is recessed in the non-overlapping region Z2, and the third magnetic layer 13 has a shape that fills the recess of the principal surface of the second magnetic layer 12 in the non-overlapping region Z2. Thereafter, similar processing as that from FIGS. 4H to 4J of the first embodiment is performed.

Note that the oxidized region R1 may be located not in the overlapping region Z1 but in the non-overlapping region Z2 when viewed from the direction orthogonal to the first principal surface 10*a*. At this time, the non-overlapping region Z2 may have the non-oxidized region R2 as a part thereof. According to the above configuration, the oxidized region R1 is located in the non-overlapping region Z2, and thus, it is possible to increase an insulation resistance between wirings of adjacent turns of the same inductor wiring on the first principal surface 10*a*. In addition, in a case where a plurality of the inductor wirings are provided, it is possible to increase an insulation resistance between the adjacent inductor wirings on the first principal surface 10*a*. In addition, in a case where a plurality of the inductor components are disposed, it is possible to increase an insulation resistance between the inductor wirings of the adjacent inductor components. In addition, it is possible to suppress the decrease in the strength of the element body due to the oxidation by limiting the oxidized region RE Note that the magnetic sheet of the second magnetic layer 12 and the magnetic sheet of the third magnetic layer 13 may be reversed in order to achieve the above configuration.

In addition, the magnetic sheet mainly including the magnetic powder having a large particle size is used as the second magnetic layer 12, and the magnetic sheet mainly containing the magnetic powder having a small particle size is used as the third magnetic layer 13, but it is sufficient to use a magnetic sheet that is more easily oxidized than a magnetic sheet of the third magnetic layer 13 as the second magnetic layer 12.

Note that the present disclosure is not limited to the above-described embodiments, and can be modified in design within the scope not departing from the gist of the present disclosure. For example, characteristic points of the first and second embodiments may be variously combined.

Although the two first inductor wiring and second inductor wiring are disposed in the element body in the above embodiments, one or three or more inductor wirings may be disposed, and at this time, each of the number of external terminals and the number of columnar wirings is also four or more.

In the above embodiments, the "inductor wiring" is one that imparts inductance to an inductor component by generating a magnetic flux in a magnetic layer when a current flows, and a structure, a shape, a material, and the like thereof are not particularly limited. In particular, various known wiring shapes such as a meander wiring can be used without being limited to a straight line or a curve (spiral=two-dimensional curve) extending on a plane as in the embodiments. In addition, the total number of inductor wirings is not limited to one layer, and a multilayer configuration including two or more layers may be adopted. In addition, a shape of the columnar wiring is rectangular when viewed from the Z direction, but may be circular, elliptical, or oval.

Although the first principal surface of the element body is exposed in a portion excluding the external terminals in the above embodiments, but may be covered with an insulating film. At this time, the insulating film is provided in the portion where the first to third external terminals are not provided on the first principal surface of the element body. Thus, insulating properties among the first to third external terminals can be improved.

In addition, the formation of the oxidized region and the non-oxidized region is not limited to the method described in the above embodiments, and other forming methods may be used. For example, the fluidity of the resin of the magnetic layer may be increased. Thus, a density of the magnetic powder on the inductor wiring can be increased, and the oxidized region can be formed on the inductor wiring.

In addition, the fluidity of the resin of the magnetic layer may be decreased. Thus, the magnetic powder flows simultaneously with the resin, so that locking of the magnetic powder is less likely to occur. Therefore, the magnetic powder flows to a region where there is no inductor wiring due to an increase in pressure above the inductor wiring, and as a result, a filling rate of the magnetic powder above the inductor wiring decreases, and the non-oxidized region can be formed above the inductor wiring.

In addition, the magnetic layer may be press-molded on the inductor wiring to form the magnetic layer above the inductor wiring into a protruding shape, and a grinding load may be adjusted at the time of grinding a protruding portion of the magnetic layer. Thus, the non-oxidized region can be formed above the inductor wiring by causing shedding of particles of the magnetic powder in the convex portion.

What is claimed is:

1. An inductor component comprising:

an element body including magnetic powder and having a first principal surface and a second principal surface;

an inductor wiring in the element body;

a first vertical wiring that is in the element body, is connected to a first end portion of the inductor wiring, and extends to the first principal surface;

a second vertical wiring that is in the element body, is connected to a second end portion of the inductor wiring, and extends to and directly contacts the first principal surface;

a first external terminal connected to the first vertical wiring and exposed on the first principal surface; and a second external terminal connected to the second vertical wiring and exposed on the first principal surface, the magnetic powder containing an Fe element as a main component, and the first principal surface including an oxidized region in which an oxide film, in which a plurality of particles of the magnetic powder are oxidized, is exposed and a non-oxidized region in which a plurality of particles of the magnetic powder are exposed, wherein the second principal surface has the oxidized region, and an area of the oxidized region on the second principal surface is larger than an area of the oxidized region on the first principal surface.

2. The inductor component according to claim 1, wherein the element body includes a resin containing the magnetic powder, and the plurality of particles of magnetic powder in the oxidized region include a magnetic powder particle in contact with the resin with the oxide film interposed between the magnetic powder particle and the resin.

3. The inductor component according to claim 1, wherein the element body includes a resin containing the magnetic powder, and the plurality of particles of magnetic powder in the oxidized region include a magnetic powder particle in direct contact with the resin.

4. The inductor component according to claim 1, wherein a ratio of a reflectance of a wavelength of from 600 nm to 800 nm relative to a reflectance of a wavelength of less than 600 nm is higher in the oxidized region than in the non-oxidized region.

5. An inductor component comprising:

an element body including magnetic powder and having a first principal surface and a second principal surface;

an inductor wiring in the element body;

a first vertical wiring that is in the element body, is connected to a first end portion of the inductor wiring, and extends to the first principal surface;

a second vertical wiring that is in the element body, is connected to a second end portion of the inductor wiring, and extends to the first principal surface;

a first external terminal connected to the first vertical wiring and exposed on the first principal surface; and a second external terminal connected to the second vertical wiring and exposed on the first principal surface, the magnetic powder containing an Fe element as a main component, and the first principal surface including an oxidized region in which an oxide film, in which a plurality of particles of the magnetic powder are oxidized, is exposed and a non-oxidized region in which a plurality of particles of the magnetic powder are exposed, wherein the oxide film is on cut surfaces of the plurality of particles of the magnetic powder on the first principal surface.

6. The inductor component according to claim 1, wherein the first principal surface has an overlapping region overlapping the inductor wiring that is closest to the first principal surface, and the oxidized region is in the overlapping region when viewed from a direction orthogonal to the first principal surface.

7. The inductor component according to claim 1, wherein the first principal surface has an overlapping region overlapping the inductor wiring that is closest to the first principal surface, and the oxidized region is in a non-overlapping region other than the overlapping region on the first principal surface when viewed from a direction orthogonal to the first principal surface.

8. The inductor component according to claim 1, wherein a thickness of the oxide film is smaller than a particle size D50 of the magnetic powder.

9. The inductor component according to claim 1, wherein a thickness of the oxide film on the second principal surface is smaller than a thickness of the oxide film on the first principal surface.

10. The inductor component according to claim 1, wherein the element body has a plurality of side surfaces between the first principal surface and the second principal surface and connecting the first principal surface and the second principal surface.

11. The inductor component according to claim 1, further comprising:

a first extended wiring connected to the first end portion of the inductor wiring and exposed from a side surface, wherein the element body has the side surface between the first principal surface and the second principal surface and connecting the first principal surface and the second principal surface, and the side surface from which the first extended wiring is exposed has the oxidized region.

12. The inductor component according to claim 1, wherein the inductor wiring includes a plurality of the inductor wirings, and the plurality of inductor wirings are on an identical plane parallel to the first principal surface and are electrically separated from each other.

13. The inductor component according to claim 1, wherein the element body includes an immediately upper portion between the first principal surface and an upper surface of the inductor wiring on a side of the first principal surface, a particle size D50 of the magnetic powder is from 1/10 of a thickness of the immediately upper portion to twice the thickness of the immediately upper portion, and a thickness of the element body is 300 μm or less.

14. The inductor component according to claim 6, wherein a particle size D50 of the magnetic powder in the overlapping region is larger than a particle size D50 of the magnetic powder in a non-overlapping region that is a region other than the overlapping region on the first principal surface.

15. The inductor component according to claim 14, wherein an amount of Fe element in the oxidized region is larger than an amount of Fe element in the non-oxidized region.

16. The inductor component according to claim 1, wherein the element body includes a plurality of magnetic layers laminated in a direction orthogonal to the first principal surface, and one of the plurality of magnetic layers in contact with the inductor wiring is disposed along a part of an outer shape of the inductor wiring.

17. The inductor component according to claim 1, wherein a particle size D50 of the magnetic powder in the oxidized region is larger than a particle size D50 of the magnetic powder in the non-oxidized region.

18. An inductor component comprising:

an element body including magnetic powder and having a first principal surface and a second principal surface;

an inductor wiring in the element body;

a first vertical wiring that is in the element body, is connected to a first end portion of the inductor wiring, and extends to the first principal surface;

a second vertical wiring that is in the element body, is connected to a second end portion of the inductor wiring, and extends to and directly contacts the first principal surface;

a first external terminal connected to the first vertical wiring and exposed on the first principal surface; and a second external terminal connected to the second vertical wiring and exposed on the first principal surface, the magnetic powder containing an Fe element as a main component, and the first principal surface having an oxidized region containing the Fe element at 65% by weight or more and an O element at 24% by weight or more among a plurality of particles of the magnetic powder, and a non-oxidized region in which a plurality of particles of the magnetic powder are exposed, wherein the second principal surface has the oxidized region, and an area of the oxidized region on the second principal surface is larger than an area of the oxidized region on the first principal surface.

* * * * *